J. M. AHLGREN.
STORAGE BATTERY CONTAINER.
APPLICATION FILED OCT. 6, 1917.

1,341,871.

Patented June 1, 1920.

WITNESS.
Walter H. Troemel.

INVENTOR
John M. Ahlgren
BY
Bradford & Doolittle
ATTORNEYS

UNITED STATES PATENT OFFICE.

JOHN M. AHLGREN, OF INDIANAPOLIS, INDIANA.

STORAGE-BATTERY CONTAINER.

1,341,871.     Specification of Letters Patent.     Patented June 1, 1920.

Application filed October 6, 1917. Serial No. 195,072.

*To all whom it may concern:*

Be it known that I, JOHN M. AHLGREN, a citizen of the United States, residing at Indianapolis, Marion county, and State of Indiana, have invented and discovered certain new and useful Improvements in Storage-Battery Containers, of which the following is a specification.

My invention relates to storage battery containers and its object is to provide a construction in which the necessity for jars or cells made of rubber or similar material and a separate jar receiving box of wood or other substance is dispensed with, and a single container is provided, made in one piece and capable of retaining the plates and electrolyte and of also being safely handled and shipped, and in which the deterioration resulting from the use of rubber to form the cell walls is avoided.

With this object in view, my invention is embodied in preferable form in the construction hereinafter described and illustrated in the accompanying drawings.

Figure 1:
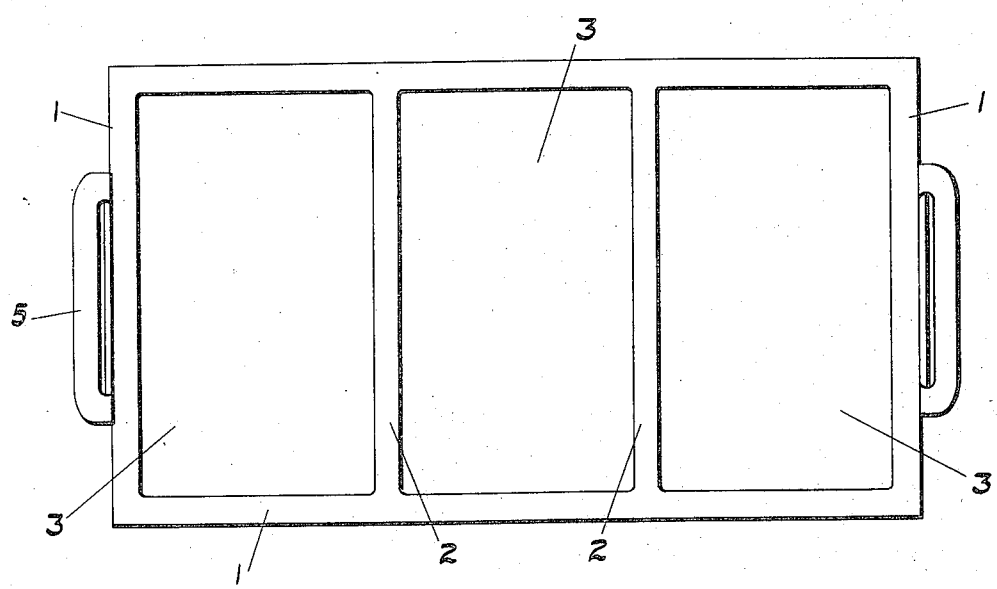
Figure 2:
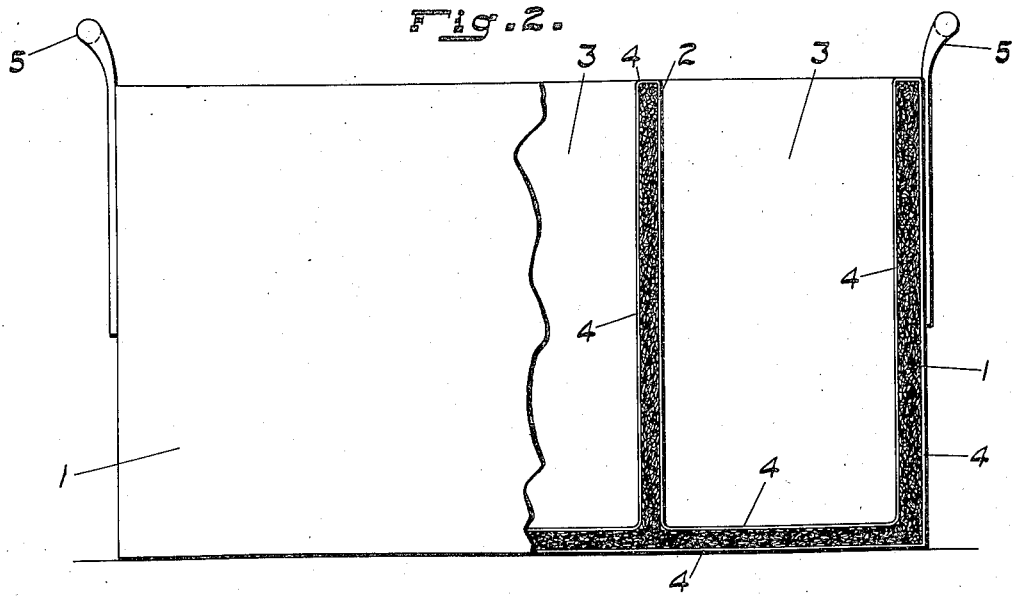

In these drawings, Figure 1 is a top plan view of a storage battery container embodying my invention, and Fig. 2, a side view in elevation.

Referring to the drawings, the container is made of a single integral body of pulp comprising paper stock, fiber or other suitable stock pressed into form. 1 indicates the walls of the container which has the usual rectangular shape of the box customarily employed in storage batteries and 2 indicates cross partitions integral with the body and separating the interior of the same into separate cells 3 in which the battery plates may be mounted in the usual manner. The interior surfaces of the walls of the body and the surfaces of the partitions are coated with a lining 4 of enamel, of a composition which is impervious to the electrolytic action and to the acids contained in the liquid.

This enamel composition consists preferably of a mixture of silica, blue clay, arsenic and a small portion of metallic lead serving as a binder in proper proportions to enable the mixture to flow freely when sufficiently heated and evenly coat the surface of the container thereon.

The enamel coating may also be provided on the exterior surface of the container in order to protect and stiffen the same, if desired.

The container may be provided with exterior handles 5 similar to those customarily attached to wooden receiving-boxes of the ordinary storage battery.

With a battery container thus constructed the expense of a separate holding box is avoided and also the deterioration in the battery, due to the attack on the rubber of the cells by the acid in the electrolyte is obviated, and a cheap, easily formed and durable container is provided.

Having thus described my invention, what I claim is:

A battery container providing an exterior receiving and handling box and cell compartments in a single complete structure and consisting of an integral body of molded fibrous material forming the bottom and vertical walls and having vertical cross partitions integral with said body and forming in conjunction with said bottom and the end walls the battery cell compartments, and having a lining impervious to the acid of the battery and electrical action thereof on the interior surfaces of said body and partition.

In witness whereof, I have hereunto set my hand and seal at Indianapolis, Indiana, this 24th day of September, A. D. nineteen hundred and seventeen.

JOHN M. AHLGREN. [L. S.]

Witnesses:
    H. P. DOOLITTLE,
    M. L. SHULER.